United States Patent
Peng et al.

(10) Patent No.: US 11,610,603 B2
(45) Date of Patent: Mar. 21, 2023

(54) INTELLIGENT REGION UTILIZATION IN A DATA STORAGE DEVICE

(71) Applicant: Seagate Technology LLC, Fremont, CA (US)

(72) Inventors: Chee Hou Peng, Singapore (SG); Ajay Narayan Kulkarni, Longmont, CO (US); Harry Tiotantra, Singapore (SG); KayHee Tang, Singapore (SG); WenXiang Xie, Singapore (SG)

(73) Assignee: Seagate Technology LLC, Fremont, CA (US)

( * ) Notice: Subject to any disclaimer, the term of this patent is extended or adjusted under 35 U.S.C. 154(b) by 4 days.

(21) Appl. No.: 17/301,433

(22) Filed: Apr. 2, 2021

(65) Prior Publication Data

US 2022/0317886 A1 Oct. 6, 2022

(51) Int. Cl.
*G11B 5/55* (2006.01)
*G06F 3/06* (2006.01)
*G11B 20/12* (2006.01)
*G11B 20/10* (2006.01)

(52) U.S. Cl.
CPC .......... *G11B 5/5547* (2013.01); *G06F 3/0611* (2013.01); *G06F 3/0613* (2013.01); *G06F 3/0644* (2013.01); *G06F 3/0659* (2013.01); *G06F 3/0673* (2013.01); *G11B 2020/10916* (2013.01); *G11B 2020/1294* (2013.01)

(58) Field of Classification Search
None
See application file for complete search history.

(56) References Cited

U.S. PATENT DOCUMENTS

| | | | |
|---|---|---|---|
| 8,438,138 B2 | 5/2013 | Rathi et al. | |
| 8,681,443 B2 | 5/2014 | Hall | |
| 8,949,521 B1* | 2/2015 | Heath | G11B 5/5547 |
| | | | 711/112 |
| 9,054,992 B2 | 6/2015 | Wright et al. | |
| 9,280,472 B1 | 5/2016 | Dang et al. | |
| 9,747,943 B2 | 8/2017 | Zhu et al. | |
| 10,802,739 B1* | 10/2020 | Weber | G06F 3/061 |
| 2008/0091877 A1* | 4/2008 | Klemm | G06F 3/0638 |
| | | | 711/E12.001 |
| 2012/0137086 A1* | 5/2012 | Oe | G06F 3/0659 |
| | | | 711/E12.001 |
| 2013/0097341 A1* | 4/2013 | Oe | G06F 3/0611 |
| | | | 710/15 |
| 2016/0147462 A1* | 5/2016 | Squires | G06F 3/0676 |
| | | | 711/112 |

* cited by examiner

*Primary Examiner* — Peter Vincent Agustin
(74) *Attorney, Agent, or Firm* — Hall Estill Law Firm; Randall K. McCarthy

(57) ABSTRACT

A data storage device can have one or more rotating data media with data tracks that are radially disposed from a central spindle. The data tracks may be logically divided into multiple regions while a write strategy is generated with a region module to set a sequence of different regions for future data writes. Receipt of a data write request to the data storage media from a host can prompt the region module to classify the data write request as a sequential or random write in order to intelligently select a region to satisfy the data write request based on the write strategy to maximize data writing consistency for data associated with the data write request.

20 Claims, 4 Drawing Sheets

INTELLIGENT REGION UTILIZATION IN A DATA STORAGE DEVICE

SUMMARY

A data storage device, in accordance with various embodiments, has a data storage medium with a surface accessed by a transducing head and logically divided into regions by a region module. The transducing head is configured to satisfy a pending data write request with maximum input output throughput per second (IOPS) consistency by executing a region strategy generated by the region module. The region strategy dictates a head progression sequence between regions to balance data transfer rates with seek time and reduce IOPS variability.

In other embodiments, a data storage device divides a surface of a data storage medium into logical regions as dictated by a region module. A transducing head is positioned to access data on the surface and a region strategy is generated with the region module. The region strategy prescribes a transducing head progression sequence between regions to balance data transfer time with seek time during satisfaction of a pending write request to increase input output throughput per second (IOPS) consistency. The region strategy is executed in response to a write request to satisfy the write request with an IOPS consistency below a predetermined threshold.

Non-limiting embodiments of a data storage device involve dividing a surface of a data storage medium into logical regions by a region module before positioning a transducing head to access data on the surface. A region strategy is generated with the region module and prescribes a transducing head progression sequence between regions to balance data transfer time with seek time during satisfaction of a pending write request to increase input output throughput per second (IOPS) consistency. The transducing head is moved from a region located near an outer diameter of the surface towards an inner surface of the surface in accordance with the region strategy prior to receiving a write request from a host, classifying the write request, and altering the transducing head progression sequence in response to the write request classification to ensure the write request is satisfied with an IOPS consistency below a predetermined threshold.

DETAILED DESCRIPTION

Various embodiments of a data storage device optimize input/output throughput per second (IOPS) consistency to allow a data storage device utilizing rotating storage media to satisfy guaranteed performance benchmarks, such as deterministic windows, quality of service contracts, and service level agreements.

While rotating data media has been utilized for data storage for years with operational aspects that have not evolved drastically over time, improvements in the performance of a data storage device employing rotating data media have been developed to solve various practical issues. For instance, rotating storage media can suffer, compared to solid-state data storage, from relatively long random write latency due at least to the seek time between physical portions of a rotating disk. Although, relatively long random write latency has not been criticized or emphasized by clients in the past, current permanent data storage users have a continued goal of providing data input/output consistency below a variance limit.

Accordingly, embodiments are generally directed to increasing data access latency consistency over time, which decreases IOPS variability and allows a data storage device employing rotating magnetic data storage media to provide guaranteed data service levels to a host. By utilizing a write strategy that is proactively generated and executed, a data storage device can provide an intelligent balance between mechanical seek time and data transfer speed. That is, assorted embodiments execute predetermined actions of a write strategy to mitigate the differences in data transfer speeds inherent in physically locating data at different locations on a rotating disk.

Figure 1:
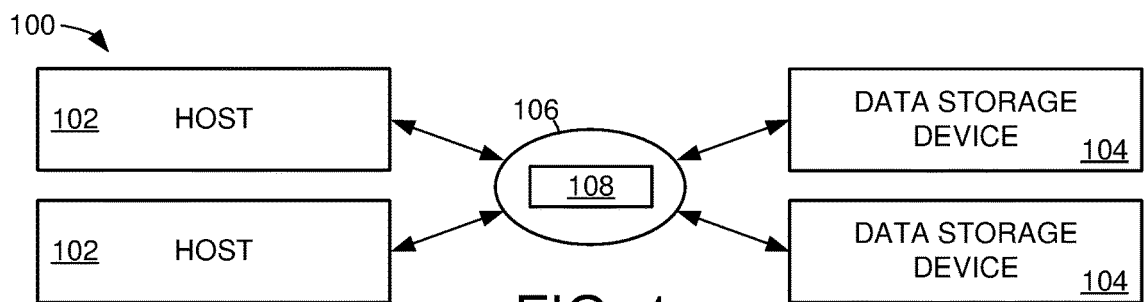
FIG. 1 is a block representation of an example data storage system configured and operated in accordance with some embodiments.

FIG. 1 depicts a block representation of an example data storage system 100 where various embodiments can be practiced. The system 100 can connect any number of hosts 102 to any number of data storage devices 104 via a network 106 that consists of wired and/or wireless signal pathways. It is contemplated that different hosts 102 store data to, and retrieve data from, different data storage devices 104, as directed by one or more storage controllers 108 of the network.

A data storage device 104 may employ any type of data storage with associated performance and capacity. For instance, a first device 104 of the system 100 can have a solid-state memory (SSD) that exhibits a first IOPS variability and capacity while a second device 104 can be a hard disk drive (HDD) with rotating media that has a second IOPS variability and capacity. The ability to utilize different data storage devices with different performance and capacities provides a diverse range of capabilities for the data storage system 100. Yet, some devices 104 have, traditionally, been omitted from servicing some system requests due to inherent operational difficulties, such as data access inconsistency for HDDs and data reliability issues in relation to the number of data accesses over time for SSDs.

Figure 2:
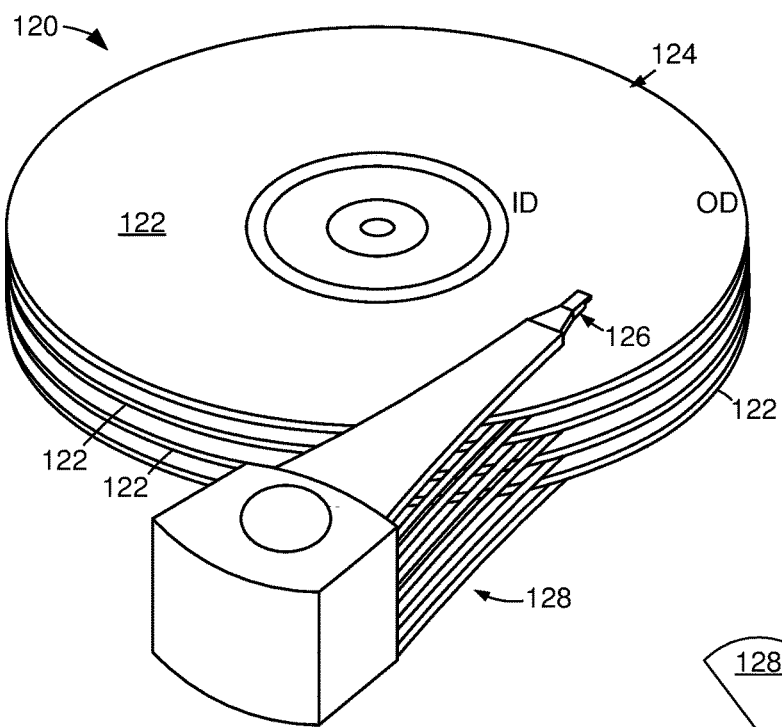
FIG. 2 displays a line representation of portions of an example data storage device that may be utilized in the data storage system of FIG. 1.

A line representation of portions of an example data storage device 120 is depicted in FIG. 2. The device 120, in accordance with some embodiments, is an HDD-type device that utilizes one or more rotating media 122 to magnetically store data on the surface(s) 124 of the respective media 122. Each data storage surface 124 has a data transducing head 126 that operates to program data to the media 122 and/or retrieve stored data from the media 122.

While multiple heads 126 can concurrently operate to access data, and data locations, on different media surfaces 124, the heads 126 are collectively moved to matching regions of the respective media 122 via an actuating mechanism 128. That is, the same location of different media surfaces 124 is concurrently accessed by different heads 126 that move in unison. Such head 126 movement relative to the media surface 124 can be characterized as a seek that corresponds with a time where each head 126 cannot read or write data.

Figure 3:
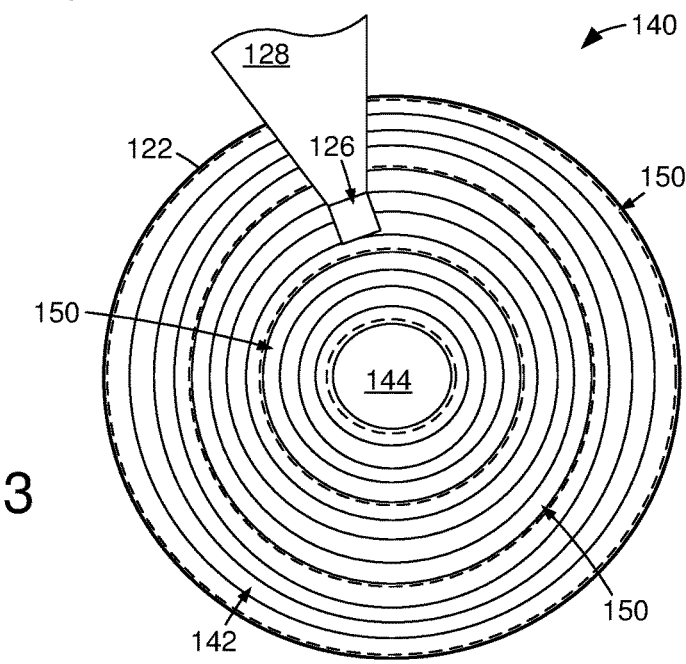
FIG. 3 depict portions of an example data storage device arranged in accordance with various embodiments.

FIG. 3 depicts portions of an example data storage medium 140 in which various embodiments may be executed as part of a data storage device 104/120. The medium 140 is accessed by a transducing head 126 that is positioned over a selected data track 142 to write and/or read data bits of the medium surface 124. It is contemplated that data tracks 142 can be any size, shape, and location on the medium surface 124, but some embodiments configure the data tracks 142 as concentric circles extending from a central spindle 144, which is the inner diameter (ID) of the medium 140, to an outer diameter (OD) of the medium 140, as shown.

Non-limiting embodiments of the data tracks 142 overlap adjacent track boundaries to provide shingled magnetic recording. Other embodiments separate adjacent data tracks 142 with buffer areas that do not contain programmed data bits. Regardless of the data track 142 configuration, the amount of data stored at tracks 142 near the OD is greater than the amount of data storage at tracks 142 near the ID due to the surface area difference inherent in the OD compared to the ID. As a result of the difference in the amount of data stored at different tracks 142 positioned from the ID to the OD, along with the seek time associated with moving a transducing head 126 between the respective data tracks 142, the data storage medium 140 can experience inconsistent IOPS and data access latency.

The arrangement of concentric data tracks 142 affords a storage controller 108 to logically organize tracks 142 into different regions to minimize the seek time of the transducing head 126. In other words, the storage controller 108 can create any number of track regions that are physically proximal to each other and allow the head 126 to service different data access requests within a single region, which reduces the effects of seek time on data access latency and IOPS. While not required or limiting, the storage controller 108 can create five different track regions 150 that progressively extend from the ID to the OD, as illustrated by segmented lines in FIG. 3.

The organization of track regions 150 allows the storage controller 108 to engage in a region progression to service pending data access requests, such as data writes. That is, the storage controller 108 can sequentially progress from track regions 150 located at the ID to regions at the OD in response to various triggers to move between different regions 150. Once the head 126 has progressed to the OD, or ID, in some embodiments, the storage controller 108 can cycle the head 126 back to the opposite extent of the data track regions 150 to begin the predetermined region 150 progression again.

Although the cycling of transducing heads 126 to the opposite side of a medium's radius can be scheduled at opportune times to mitigate the relatively long seek time from inhibiting average data access latency, such as during system down times, background operations, or standby modes, the position of the heads 126 in regions 150 near the ID for extended periods are not efficient over time and produce degraded IOPS variability compared to extended periods near the OD. Hence, various embodiments are directed to utilizing logical regions 150 near the OD more prominently that regions 150 near the ID while maintaining a progression of region 150 utilization that distributes data accesses across the available data tracks 142 of a medium 140.

Figure 4:
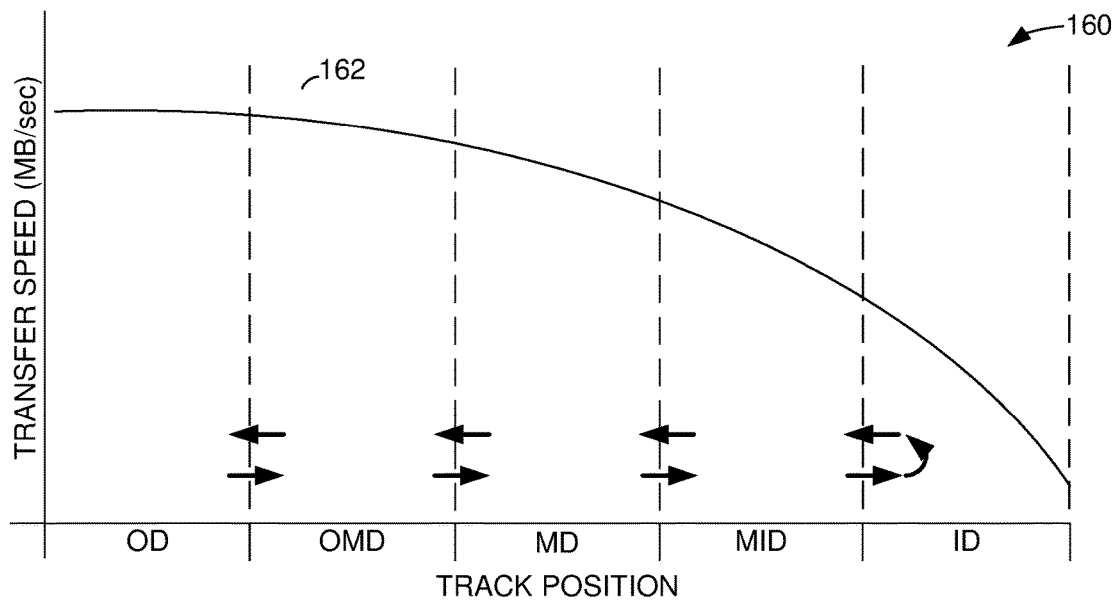
FIG. 4 plots operational data corresponding with a data storage device configured and operated in accordance with assorted embodiments.

FIG. 4 plots operational data from an example data storage device 160 operated in accordance with various embodiments. Line 162 corresponds with the data transfer rates (MB/sec) for various data track locations on a data storage medium. As shown, data tracks located proximal the OD of a medium exhibit greater peak and average data transfer rates than that of regions located inward towards the medium's ID. Indeed, as regions progressively get closer to the ID, such as the outside middle diameter (OMD), middle diameter (MD), and middle inner diameter (MID) regions, data transfer rates continually suffer.

It is contemplated that each region has an equal number of data tracks, which corresponds with an equal radial size, but such configuration is not required or limiting. With embodiments that progressively cycle through the regions from OD/OMD/MD/MID/ID and from ID/MID/MD/OMD/OD, as illustrated by solid arrows, a greater amount of time is spent by heads on the inner half of the medium's radius than the outer half. While the amount of time, and number of data accesses, can be biased so that a head utilizes the outer half of a medium's radius more than the inner half, such arrangements can be complex and lead to increased errors and failures as data bits are written and rewritten a disproportionate number of times compared to tracks of other regions.

Figure 5:
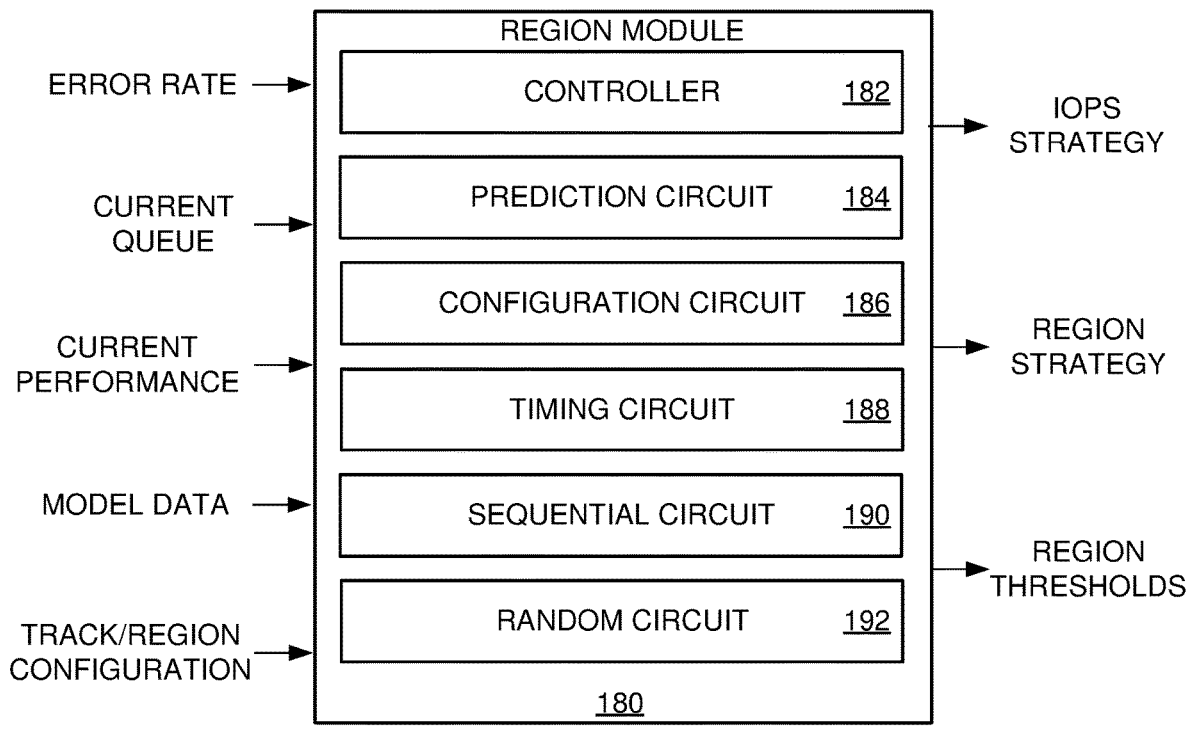
FIG. 5 depicts a block representation of an example region module that may be employed in a data storage device in some embodiments.
Figure 6:
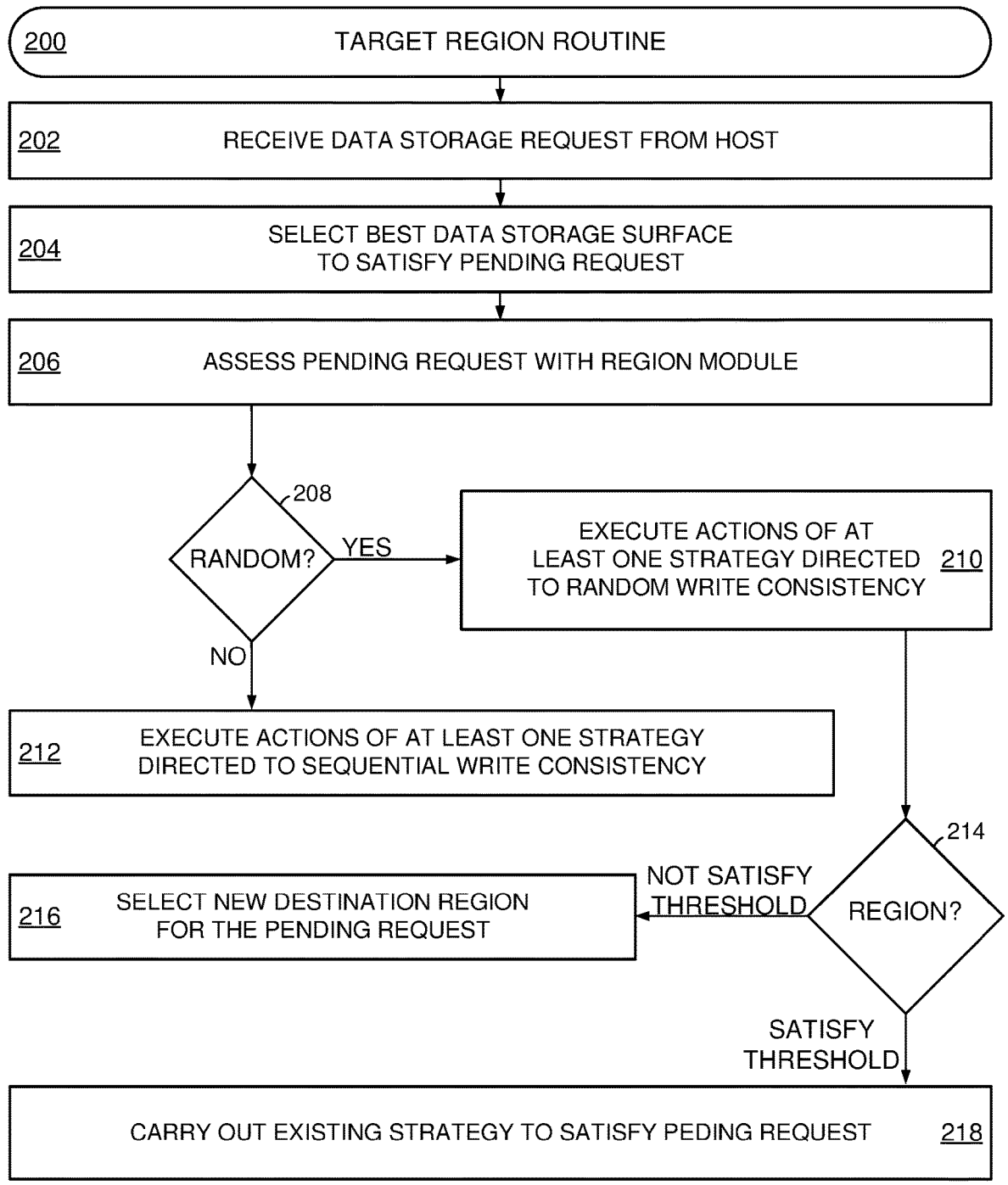
FIG. 6 is a flowchart of an example routine that may be carried out in accordance with various embodiments.
Figure 7:
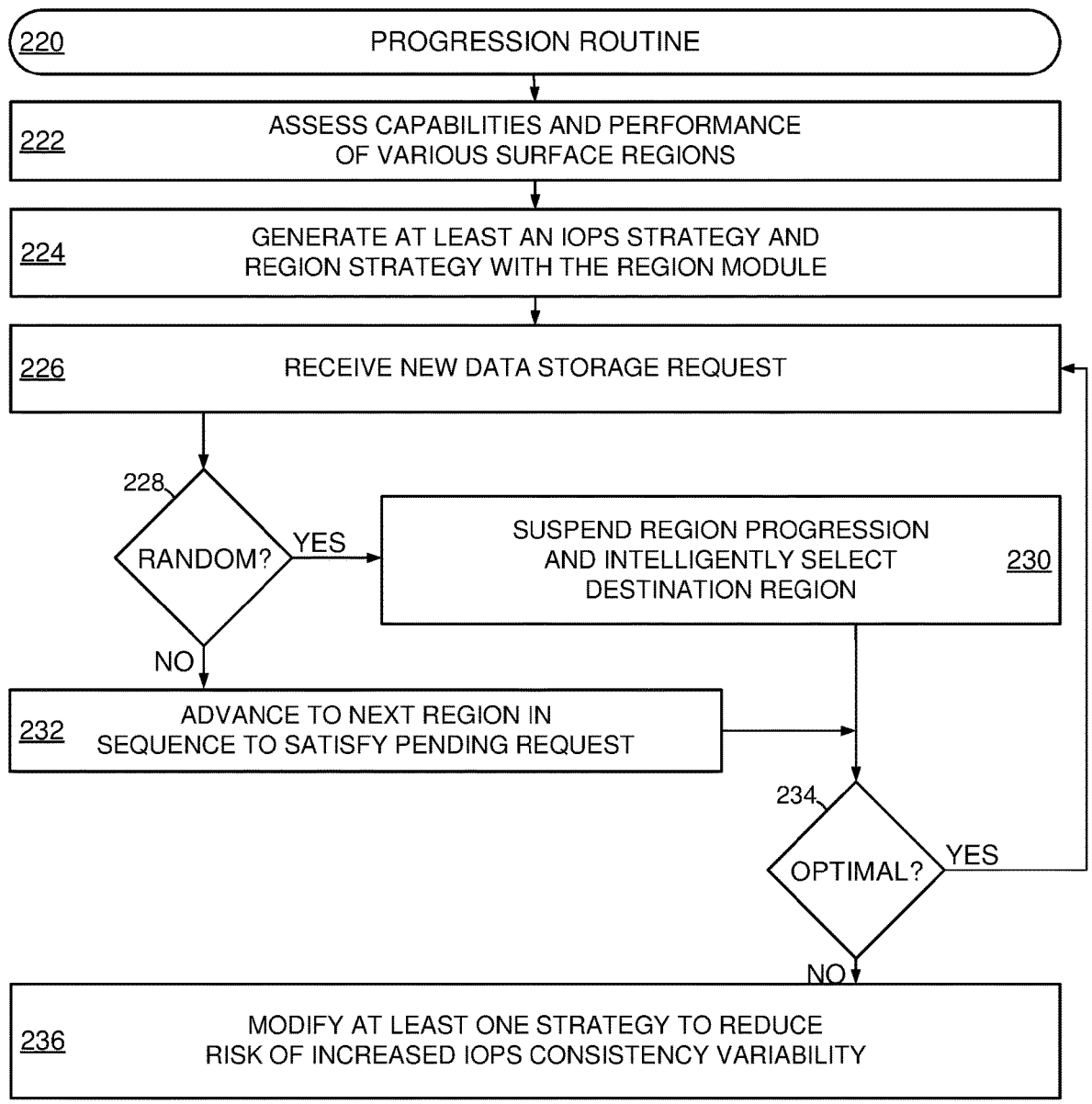
FIG. 7 provides a flowchart of an example routine that may be performed with the assorted embodiments of FIGS. 1-5.

Therefore, embodiments are directed to employing a region module that proactively generates strategies to provide data track region progression intelligently to balance head seek times with IOPS capability to maximize IOPS consistency during at least a predetermined amount of time. FIG. 5 depicts a block representation of an example region module 180 that can be resident as software and/or hardware in any component of a data storage system, such as a host, controller, or data storage device, in accordance with assorted embodiments. The module 180 can employ one or more controllers 182, such as a microprocessor or other programmable circuitry, to translate one or more inputted information into at least an IOPS strategy, progression strategy, and region thresholds.

While the controller 182 can process any types and volumes of information to generate one or more strategies, some embodiments input information corresponding to current data access request queue volume, current data storage performance of various portions of a data storage medium, logged errors and failures, model data from other data storage devices, and current data track configurations to understand the current head seek time impact on IOPS consistency and the data transfer speed capability of assorted tracks and regions of the data storage medium.

The region module 180 can employ a prediction circuit 184 that can operate alone, or in combination with the controller 182, to translate one or more input information into predicted events, actions, errors, and data storage performance. That is, a prediction circuit 184 can forecast various future occurrences from current, past, and model information, such as volume of future data access requests, ratio of future data write requests to data read requests, failure rates, data access latency average, seek time, and IOPS for one or more regions of a data storage media. The ability to predict future errors, region performance, and seek times allows the module controller 182 to generate intelligent proactive and/or reactive actions for the respective IOPS and region strategies that avoid, or mitigate, a performance degradation.

The prediction circuit 184, in some embodiments, can be utilized to forecast how different proactive and/or reactive actions will contribute to data storage performance in the future. For instance, the controller 182 can generate an action that is tested by the prediction circuit 184 for efficacy and potential data storage performance consequences. More specifically, the prediction circuit 184 can forecast how altering the number of data tracks in a region or implementing various different threshold data writes will affect IOPS, data access latency, seek time, and error rate. The intelligent use of the prediction circuit 184 to generate strategy actions and/or test how actions will influence future data storage performance ensures that the strategies created by the module 180 will maintain a maximum IOPS consistency and a minimum level of variability for a set period of time.

A configuration circuit 186 of the region module 180 can identify the current data track and region configuration and generate one or more proactive and/or reactive actions that alter the size and/or position of the respective regions to optimize IOPS consistency over time. The configuration circuit 186 may be directly responsible for generating and maintaining the region strategy that dictates what regions will be accessed for data reads and/or data writes in response to assorted data access requests from one or more hosts. For example, the configuration circuit 186 can maintain the region strategy to prescribe a progression of head movement between regions in response to pending and/or executed data access requests as well as real-time IOPS.

It is contemplated that the configuration circuit 186 operates in conjunction with a timing circuit 188 to determine the progression of a transducing head from region to region. The timing circuit 188 can prescribe an amount of time, a number of data writes, a number of data reads, error rate, real-time IOPS, and data access latency that triggers progression of a head to the next region. The timing circuit 188 can provide the IOPS strategy with actions that reduce IOPS variability over time. For instance, the timing circuit 188 can prescribe buffering of data writes to a separate memory, altering assigned data addresses, suspending error correction, and/or artificially reducing the speed of data writes to mitigate variability in IOPS over time.

The IOPS strategy may further have actions specifically directed to particular types of data writes. A sequential circuit 190 can be configured to analyze the handling of sequential writes to one or more data tracks and/or regions. The sequential circuit 190 may prescribe actions for the IOPS strategy that increase the data transfer speed for a pending sequential write. As a non-limiting example, the sequential circuit 190 can generate actions that tend a transducing head towards the OD of a data storage medium, which may override an existing region progression from the region and/or IOPS strategy.

In other words, the sequential circuit 190 may generate actions for the respective strategies that respond to detected sequential writes by taking precedence and conducting head movements optimized for IOPS consistency for sequential writes. It can be appreciated that sequential writes correspond with relatively low head seek times, which allows the actions generated by the sequential circuit 190 to provide high data transfer speeds by staying in a single region located towards the outer portion of the medium. However, writing errors can jeopardize the IOPS of a sequential write. Hence, the sequential circuit 190 can prescribe actions that mitigate the occurrence of errors, such as lowering region thresholds for transferring between regions, altering a head to a more reliable data track in a region, or changing the start address of a write, to provide maximum IOPS consistency.

Just as the sequential circuit 190 can prescribe actions to optimize the storage of sequential writes, a random circuit 192 can generate actions for the respective strategies that minimize IOPS variability over time. In a non-limiting example, the random circuit 192 can prescribe different regions, region selection, and region progression for various sizes of random write data, which can be defined as writes with non-sequential logical block addresses. Prescribed actions can focus, in some embodiments, random writes to a single region that is selected based on criteria generated by the random circuit 192, such as the region threshold number of writes recently, or ever, performed to a region, error rate of a region, seek time for the random writes, and region average transfer rate.

As such, the random circuit 192 can generate actions that act differently for different sizes and/or locations of random writes of host-generated data in order to minimize IOPS variability in the satisfaction of the pending write. In contrast to the sequential circuit 190 that does not have a high seek time variability to factor in to optimizing IOPS, the random circuit 192 often must balance the predicted seek time to satisfy a random write with the error rate and other region performance factors to choose the best region and write parameters to maximize IOPS consistency.

The region module 180 can be employed in the example target region routine 200 to respond to encountered host-generated writes with optimized IOPS consistency. The routine 200 begins with receiving at least one data storage request in step 202 from a host connected to a data storage device as part of a data storage system. The request can be a data write that corresponds with host-generated data that is to be stored in at least one location of the data storage device. It is contemplated that the destination data storage device is a HDD employing at least one rotating medium that magnetically stores data via a transducing head.

Receipt of a data storage request prompts a region module connected to the data storage device to select the best data storage medium surface to satisfy the pending request in step 204. In the event a host given address is statically mapped to a a corresponding media physical address, step 204 may send data from a separate memory, such as a dynamic random access memory cache, instead of data read from a medium surface. The region module may, in step 204, compare the current and/or predicted, data storage performance of multiple different data storage surfaces to choose the surface that exhibits the highest likelihood of providing the most consistent IOPS during the satisfaction of the pending request. With the destination storage surface selected, the region module proceeds to assess the request in step 206 to determine at least the type, size, and likelihood of errors occurring during writing, or reading, of data associated with the request.

Decision 208 evaluates the results of the request assessment in step 206 to determine if the request corresponds with a sequential or random write, which can be characterizes as a continuous or non-sequential logical and/or physical block addresses. A random write request triggers step 210 to execute the assorted actions of the IOPS and region strategies directed to random writes while a sequential write request triggers step 212 to execute the actions of the IOPS and region strategies associates with sequential writes.

In the event a random write is pending, step 210 proceeds to decision 214 where a particular region of the selected storage surface is selected to satisfy the pending request. It is contemplated that decision 214 evaluates multiple different regions of a single storage surface to ensure the optimal region is being initially selected. Decision 214 evaluates the data access activity of a selected region and determines if the region's activity is more than a threshold value of the region thresholds maintained by the region module, such as total number of data writes, average number of writes over time, overall number of encountered errors, average number of errors over time, logged IOPS, predicted IOPS, and/or seek time.

A determination that the initially selected region has had, or is predicted to have, a greater volume of activity and/or performance that does not meet one or more predetermined region thresholds causes step 216 to select a new destination region to satisfy the request, which may be the next region in a progression designated by the predetermined region strategy or a different region selected by the region module in response to the current and/or predicted performance of the initially selected region. For instance, step 216 may progress two regions, instead of one, in response to a selected region having particularly problematic performance to satisfy the pending request within predetermined IOPS consistency variance limits.

At the conclusion of selecting a new region in step 216, decision 214 is revisited to ensure that no predetermined thresholds will violate, or are predicted to be violated, in the satisfaction of the pending request. When no region thresholds are exceeded or violated, decision 214 advances to step 218 where the transducing head carries out the pending request by accessing data bits of one or more data tracks of the destination region. Through the execution of routine 200, the IOPS strategy, region strategy, and region thresholds established by the region module are utilized to select the best possible destination region to satisfy a pending data storage request with the maximum IOPS consistency.

The intelligent region selection of routine 200 may be complemented by the management of the respective strategies in progression routine 220 to proactively position a transducing head in the best position to service data storage requests with minimal seek time, which corresponds with the maximum IOPS consistency for a single region as well as a data storage surface as a whole. Initially, step 222 assesses the capabilities and performance of various logical regions of one or more rotating storage media. Step 222 may, in some embodiments, conduct region module generated test patterns to assess the respective regions or, in other embodiments, monitor the satisfaction of host-generated requests to determine the assorted performance and capabilities.

As a result of identification of the different actual and predicted capabilities and performance of assorted regions in step 222, an IOPS strategy and region strategy are each generated in step 224 by the region module. The IOPS strategy can contain any number of proactive and reactive actions to increase IOPS consistency in the satisfaction of sequential and random data write requests. The actions of the IOPS strategy can strike a balance between data transfer speed and head seek time for various regions, and initial head positions.

Meanwhile, the region strategy can prescribe one or more region progressions that correspond with region thresholds set during step 224. For instance, the region strategy can prescribe a progression for sequential writes that trends head placement towards the outer data tracks, and regions, of a storage surface by spending more time at the outer-most regions and/or cycling from an ID region all the way to the OD region, instead of cycling from ID to the next physically adjacent region. As another non-limiting example, the region strategy can prescribe a progression that moves the transducing head to a standby position after the satisfaction of a write request, which can increase overall head seek time, but reduce the real-time seek time after a response is received.

Next, step 226 receives new data storage requests from one or more hosts that are assessed for type, size, and initially assigned physical destination address, if any. The assessment of step 226 allows decision 228 to determine if a random write request is pending that meets criteria of the IOPS strategy to prompt intelligent region selection in step 230, such as that from routine 200, without following a particular region progression or selecting the next region in the existing progression to service the pending request. That is, decision 228 does not simply have a binary result if a pending request is sequential or random and, instead can evaluate if pending random requests merit intelligent region selection in step 230 that consumes valuable system power and processing or merit simple movement of a head to the next region in the predetermined progression in step 232. While not required, such evaluation of decision 228 can involve the prediction of the pending random write to exceed a set IOPS consistency variability threshold.

At any time during the satisfaction of data storage requests, decision 234 can evaluate if the current strategies are optimal to current conditions and performance of one or more storage surfaces. Although not required or limiting, decision 234 can evaluate if the currently prescribed progressions, region selections, and thresholds provide the best possible balance of transducing head seek time with region data transfer speed to provide maximum IOPS consistency over time. It is contemplated that the progression analysis of decision 234 can be considered for a particular type of request, such as optimizing progressions to provide the best consistency for random writes, sequential writes, writes above a certain size, or requests with certain variability limits.

A determination that current strategy progression(s) are optimal for the actual, and predicted, performance of various regions of a data storage device prompts a return to step 226 where new requests are received and serviced in turn. However, a sub-optimal conclusion from decision 234 triggers step 236 to modify one or more strategies to reduce the risk of satisfying a pending request with IOPS consistency that is more variable than possible. The strategy modifications of step 236, in some embodiments, involves intelligently moving a transducing head during available times, such as moving a head to an OD or midpoint of a surfaces radius during system inactivity, power down, or a throttling operation where the region module artificially raises the write latency by refraining from data access operations in order to provide greater overall consistency. That is, execution of the strategies of the region module may produce greater IOPS consistency while deliberately not writing data at peak storage performance.

Through the assorted embodiments of a data storage device employing a region module, variance of data writes to an HDD can be reduced, which allows the device to guarantee performance to satisfy a service level agreement, quality of service contract, and/or deterministic window with a host. The inherent variance in data transfer rates from ID to OD on a rotating storage medium in combination with the seek time of a transducing head can be mitigated through the generation and execution of the assorted strategies from a region module that adapts to the type of write request received and selects the data region that provides the best balance of transfer rate and seek time to ensure IOPS consistency is maintained below a limit set by the region module, SLA, QoS, and/or deterministic window.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed. For example, the particular elements may vary depending on the particular application without departing from the spirit and scope of the present disclosure.

What is claimed is:

1. A method comprising:
dividing a surface of a data storage medium into logical regions by a region module;
positioning a transducing head to access data on the surface;
generating a region strategy with the region module, the region strategy prescribing a transducing head progression sequence between regions to balance data transfer time with seek time during satisfaction of a pending write request to increase input output throughput per second (IOPS) consistency, region strategy prescribing moving the transducing head from an inner diameter of the surface directly to an outer diameter of the surface in accordance with the transducing head progression sequence; and
executing the region strategy in response to a write request to satisfy the write request with an IOPS consistency below a predetermined threshold.

2. The method of claim 1, wherein the region strategy is generated after the region module assesses a data storage performance of each region of the surface.

3. The method of claim 1, wherein the region strategy prescribes proactive actions to reduce IOPS variability for a random write request.

4. The method of claim 3, wherein the region strategy prescribes proactive actions to reduce IOPS variability for a sequential write request.

5. The method of claim 3, wherein the proactive actions comprise moving the transducing head between regions of the surface.

6. The method of claim 3, wherein the proactive actions comprise testing a region to determine if the region has experience a volume of data access activity that is greater than a region threshold generated by the region module.

7. The method of claim 1, wherein a prediction circuit of the region module forecasts a pending write request will surpass the predetermined threshold and advances the transducing head to a next region of the transducing head progression sequence.

8. The method of claim 1, wherein the region strategy positions the transducing head in the outer half of the surface's diameter when not satisfying a pending data access request from a host.

9. The method of claim 1, wherein each region comprises a uniform number of data tracks, each data track storing multiple data bits.

10. The method of claim 1, wherein the IOPS consistency is measured over time during the satisfaction of multiple different write requests to the surface.

11. The method of claim 1, wherein the seek time is associated with an amount of time the transducing head moves while being incapable of writing data.

12. The method of claim 1, wherein the surface has a variable data transfer rate depending on the physical location on the surface.

13. The method of claim 1, wherein the IOPS consistency is maintained by the region strategy for multiple different regions.

14. The method of claim 1, wherein the region strategy dictates a head progression sequence between regions that reduces IOPS variability between different regions.

15. A method comprising:
dividing a surface of a data storage medium into logical regions by a region module;
positioning a transducing head to access data on the surface;
generating a region strategy with the region module, the region strategy prescribing a transducing head progression sequence between regions to balance data transfer time with seek time during satisfaction of a pending write request to increase input output throughput per second (IOPS) consistency;
moving the transducing head from a region located near an outer diameter of the surface towards an inner surface of the surface in accordance with the region strategy;
receiving a write request from a host;
classifying the write request; and
altering the transducing head progression sequence in response to the write request classification to ensure the write request is satisfied with an IOPS consistency below a predetermined threshold.

16. The method of claim 15, wherein the write request is classified as a sequential write and the transducing head progression sequence is altered to utilize a region closer to the outer diameter of the surface than the inner diameter of the surface.

17. The method of claim 15, wherein the write request is classified as a random write and the transducing head progression sequence is suspended while the region module selects a best possible region to satisfy the write request with an IOPS consistency below the predetermined threshold.

18. The method of claim 15, wherein the write request is classified as a random write and the transducing head progression sequence is maintained as a next region in the sequence is selected to satisfy the write request.

19. The method of claim 15, wherein the region module alters the transducing head progression sequence in response to a determination that a best possible IOPS consistency is not possible with the existing transducing head progression sequence.

20. The method of claim 15, wherein the transducing head progression sequence biases the transducing head towards an outer half of the surface's diameter.

* * * * *